(12) United States Patent
Daoud et al.

(10) Patent No.: US 6,314,230 B1
(45) Date of Patent: Nov. 6, 2001

(54) FIBER INTERCONNECTION ASSEMBLY

(75) Inventors: Bassel H. Daoud, Parsippany, NJ (US); Ivan Pawlenko, Holland, PA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/521,214

(22) Filed: Mar. 8, 2000

(51) Int. Cl.$^7$ ................................................. G02B 6/00
(52) U.S. Cl. ................................. 385/135; 385/134
(58) Field of Search .................................. 385/134–139

(56) References Cited

U.S. PATENT DOCUMENTS

| | | | |
|---|---|---|---|
| 4,502,754 | 3/1985 | Kawa | 385/134 X |
| 5,402,515 | 3/1995 | Vidacovich et al. | 385/135 |
| 5,434,944 | 7/1995 | Kerry et al. | 385/135 |
| 5,778,130 | * 7/1998 | Walters et al. | 385/134 |
| 5,923,807 | 7/1999 | Wild | 385/135 |

* cited by examiner

Primary Examiner—Phan T. H. Palmer
(74) Attorney, Agent, or Firm—Dickstein Shapiro Morin & Oshinsky LLP

(57) ABSTRACT

A fiber optic interconnection assembly is described. The assembly includes a network side and a customer side. Pivoting panels which can be locked in a closed position separate the network side from the customer side. The locking mechanism locks the pivoting panels in the closed position, thereby preventing unauthorized access to the network side. Incoming fibers enter the network side, wind through fiber troughs and connect to interconnection sites on the pivoting panels. Outgoing fibers enter the customer side, wind through fiber troughs and connect to the interconnection sites on the pivoting panels.

25 Claims, 6 Drawing Sheets

FIBER INTERCONNECTION ASSEMBLY

FIELD OF THE INVENTION

The present invention relates generally to a fiber optic communications network, and more particularly to an interconnection assembly allowing access to a customer side while inhibiting access to a network side of the assembly.

BACKGROUND OF THE INVENTION

Optical fibers have a variety of uses, one of which is for carrying voice and/or data in a telecommunications system. Optical fibers are run from a central telephone office to numerous locations or sites. At each location or site, such as at a business or a domestic residence, a number of fibers are run to specific telephone jacks. The input fibers from the central telephone office and the fibers outputting to the jacks are connected at an interconnection box.

Conventional interconnection boxes consist of two sections, a network section and a customer section. Only network technicians are intended to access the network section. The network section, in addition to receiving input fibers, provides slack storage and terminations for the input fibers. It is further intended that the end user (the customer) be allowed access to the customer section, which includes the output fibers.

The customer is not intended to access the network section. Conventional interconnection boxes further include two separate covers with two sets of security locks. One cover and security lock govern access to the network section, while the other cover and security lock govern access to the customer section.

Other conventional boxes provide no mechanism for inhibiting access by the customer to the network section. The device described in U.S. Pat. No. 5,778,130 (Walters et al.) is a connector housing which includes an optical connector housing having a connector panel. The panel allows for the interconnection of incoming optical fibers with outgoing fibers. The connector panel is covered by a hinged door. A rear cable area houses the outgoing fibers. The network section of the Walters et al. device is easily accessible by anyone through the door.

Still other conventional devices include complicated designs involving numerous pieces for separating the network side from the customer side of a fiber interconnection box. U.S. Pat. No. 5,434,944 (Kerry et al.) describes a modular unit with a base, a fiber organizer unit, and a top unit. Incoming fiber cables enter the base through inlet slots and are coiled within the base before entering through the bottom of the fiber organizer unit. There the fiber cable is clamped at an end and four fibers from within the fiber cable are looped and stored in a lower portion of the fiber organizer unit. Each end of the fibers is fitted to a tube, which is fed into the top unit. The tubes connect with the customer's fibers through one or more units. The top unit includes a panel in which the units are mounted. The top unit further has a sliding cover and a transparent lid.

There is a need for a fiber interconnection box with fewer parts and which inhibits access by the customer from the portion of the box housing the fibers incoming from the network.

SUMMARY OF THE INVENTION

The present invention provides a fiber interconnection system which includes a network section and a customer section. The network section includes at least one spool, at least one fiber trough, a first side panel, and at least one input fiber. Each of the input fibers are capable of being coiled around a respective one of the spools and of being wound through a respective one of the fiber troughs to terminate at an input fiber connector. The customer section includes at least one pivoting panel, the pivoting panel being hinged to said first side panel, at least one fiber trough, and at least one output fiber. Each of the output fibers is capable of being wound through a respective one of the customer section fiber troughs to terminate at an output fiber connector, and each of the output fiber connectors is interconnected with a respective input fiber connector through one of the pivoting panels. Each of the network section fiber troughs and the customer section fiber troughs are positioned on each pivoting panel.

The present invention further provides a method for preventing unauthorized access to a section of a fiber interconnection system including a network section and a customer section. The method includes introducing at least one input fiber to the network section, positioning each input fiber at an interconnection site, positioning each of at least one output fiber at the interconnection site and attaching each output fiber to a corresponding input fiber, pivoting the pivoting panels to a closed position, and locking the pivoting panels in the close position. Each of the interconnection sites is located on one of a plurality of pivoting panels.

The foregoing and other advantages and features of the invention will be more readily understood from the following detailed description of preferred embodiments, which is provided in connection with the accompanying drawings.

DETAILED DESCRIPTION OF THE PREFERRED EMBODIMENTS

Figure 4:
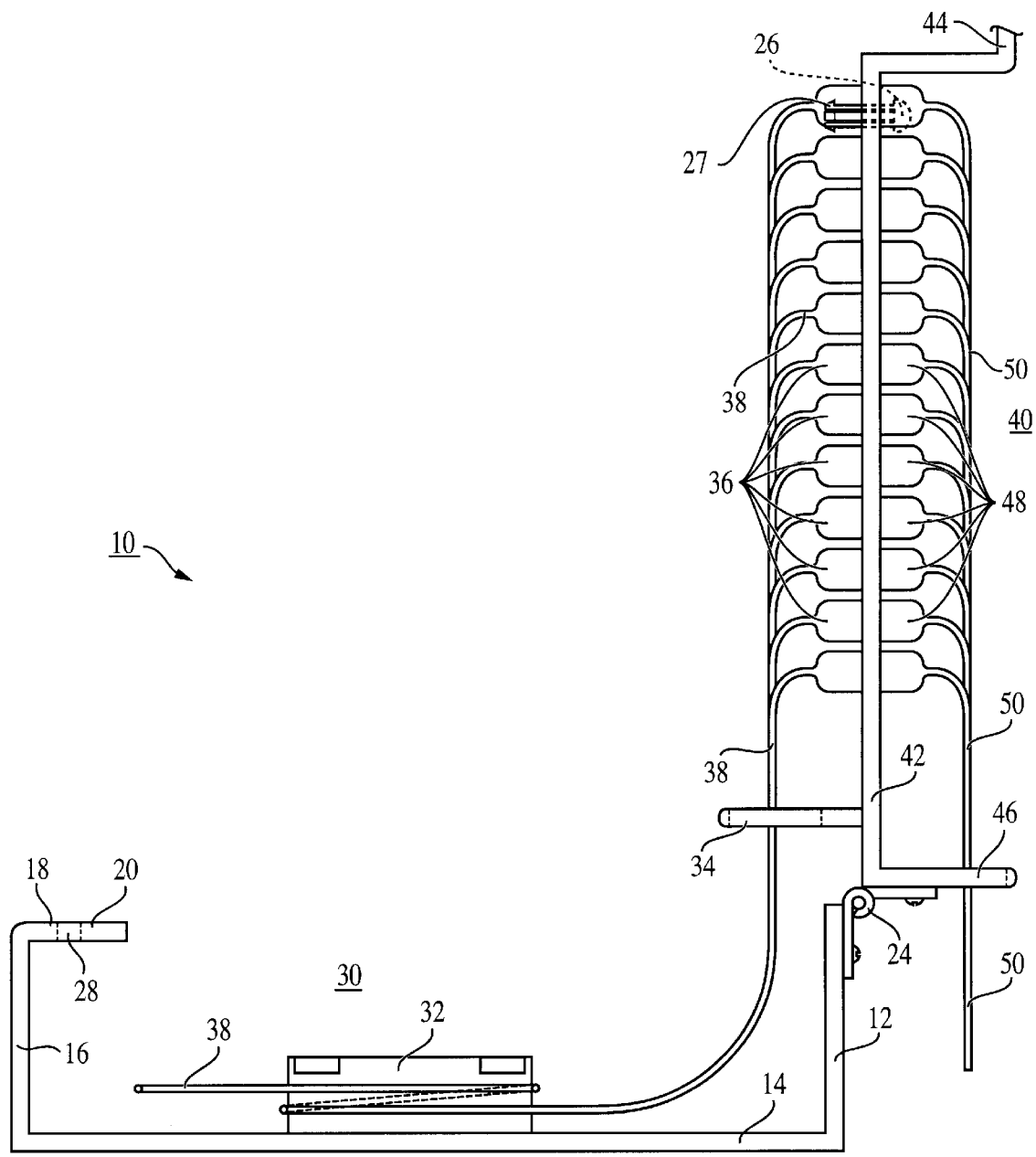
FIG. 4 is a view from the bottom of the fiber interconnection box of FIG. 2.
Figure 5:
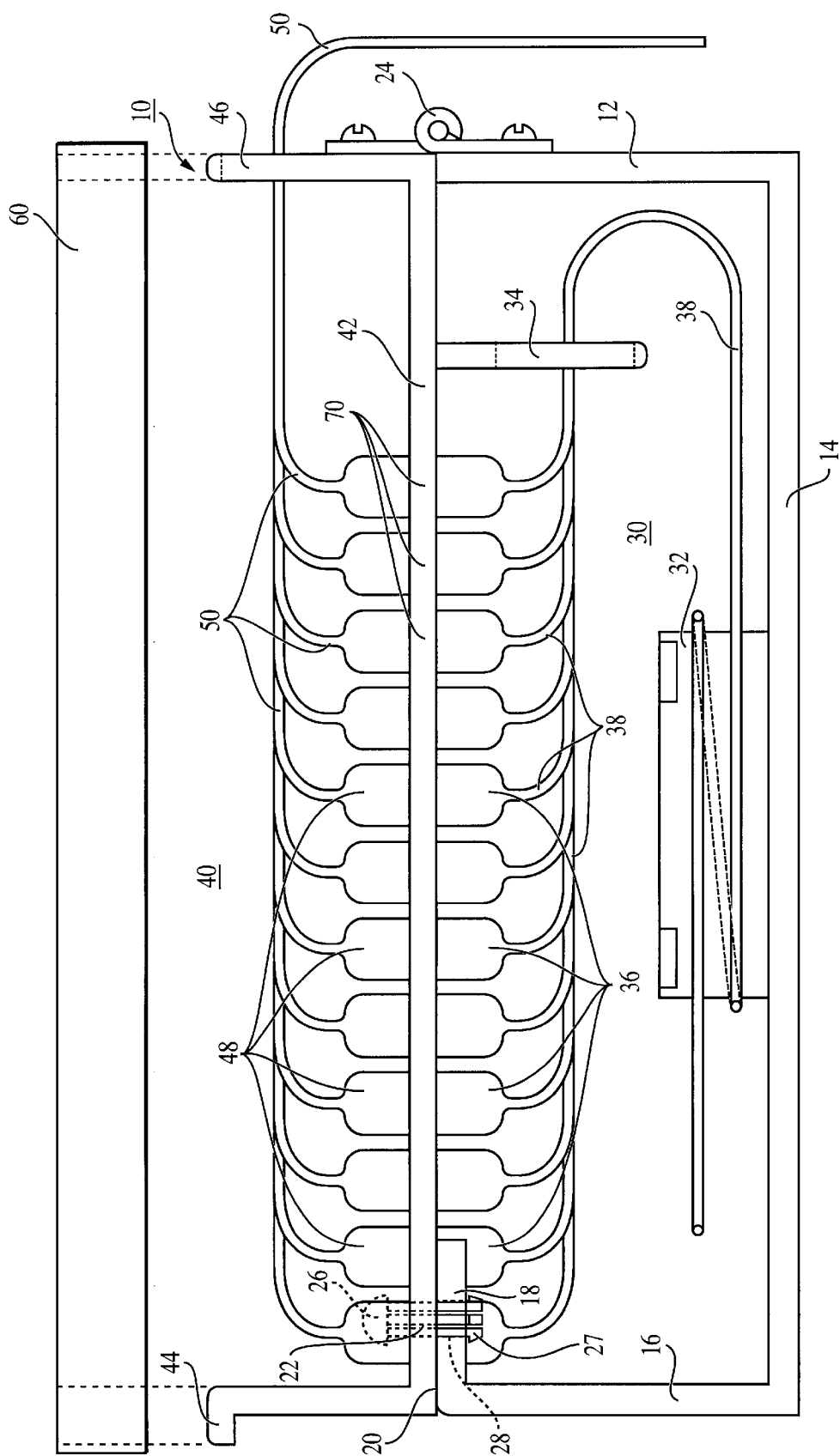
FIG. 5 is a view from the bottom of the fiber interconnection box of FIG. 3.

FIGS. 1–5 provide various views of a fiber interconnection box 10. The box 10 includes a first side panel 12 and a second side panel 16 separated by a back panel 14. The second side panel 16 includes a flange 18, which is best illustrated in FIGS. 4–5. The flange 18 includes flange face 20. Optional top and bottom panels (not shown) may further be included.

The side panels 12, 16 and the back panel 14 house the network side 30 of the box 10. A plurality of pivotable panels 42 pivot about a hinge 24 provided at an upper portion of the first side panel 12. The illustrated first side panel 12 includes panel sections $12_a$, $12_b$, $12_c$.

Figure 1:
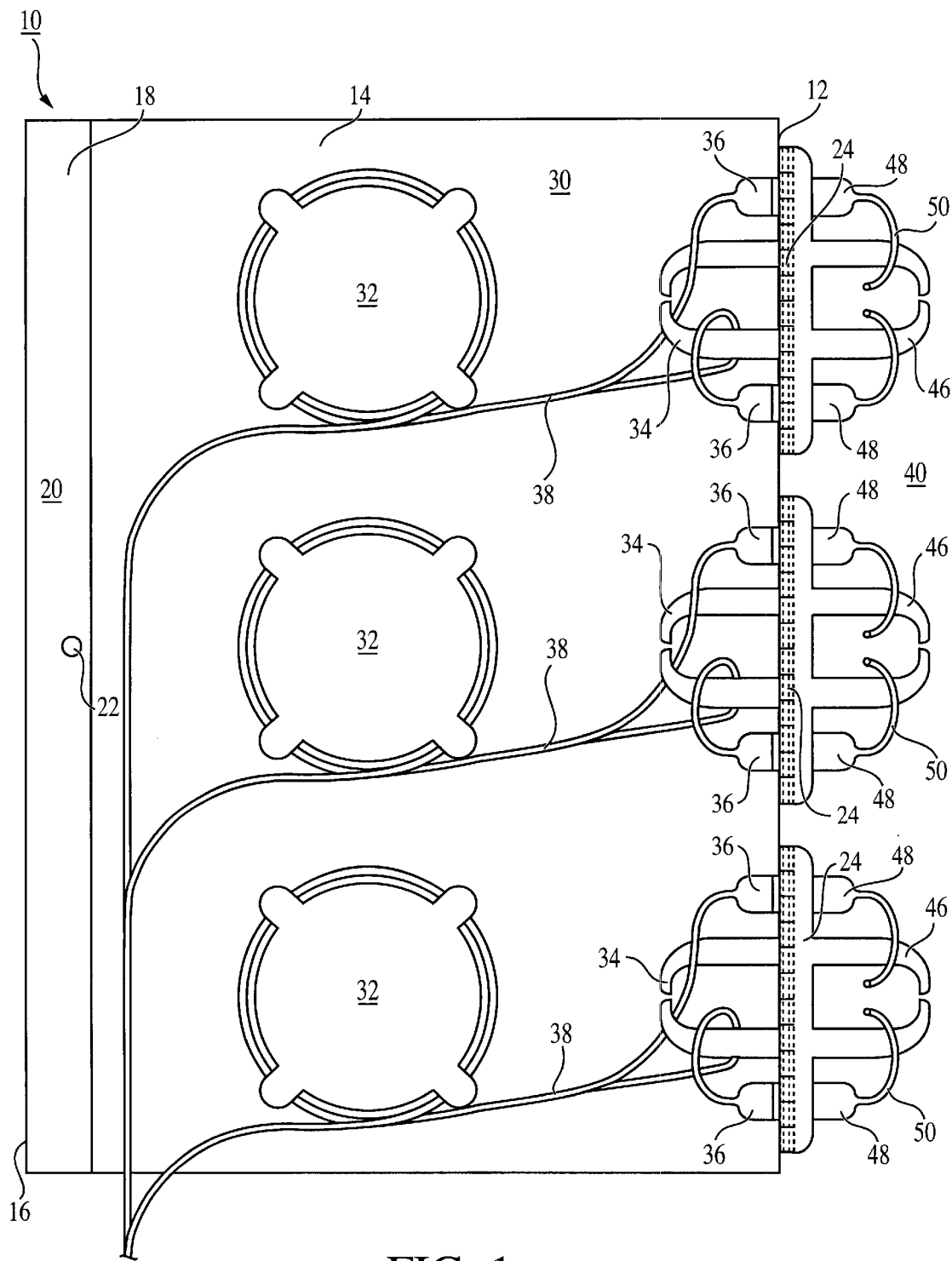
FIG. 1 is a front view of a fiber interconnection box constructed in accordance with an embodiment of the present invention.
Figure 2:
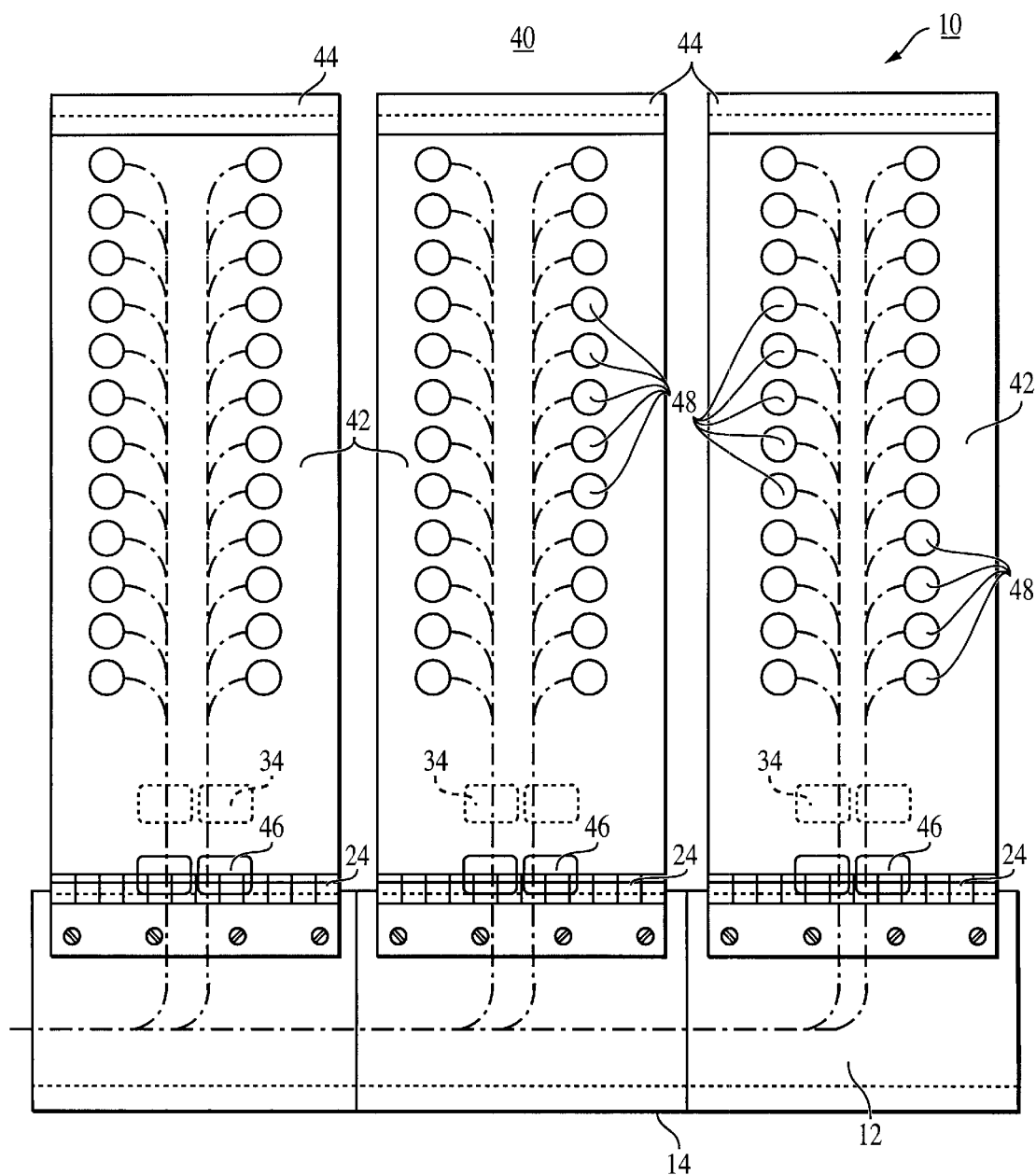
FIG. 2 is a side view of the fiber interconnection box of FIG. 1 showing pivoting panels in an open position.
Figure 3:
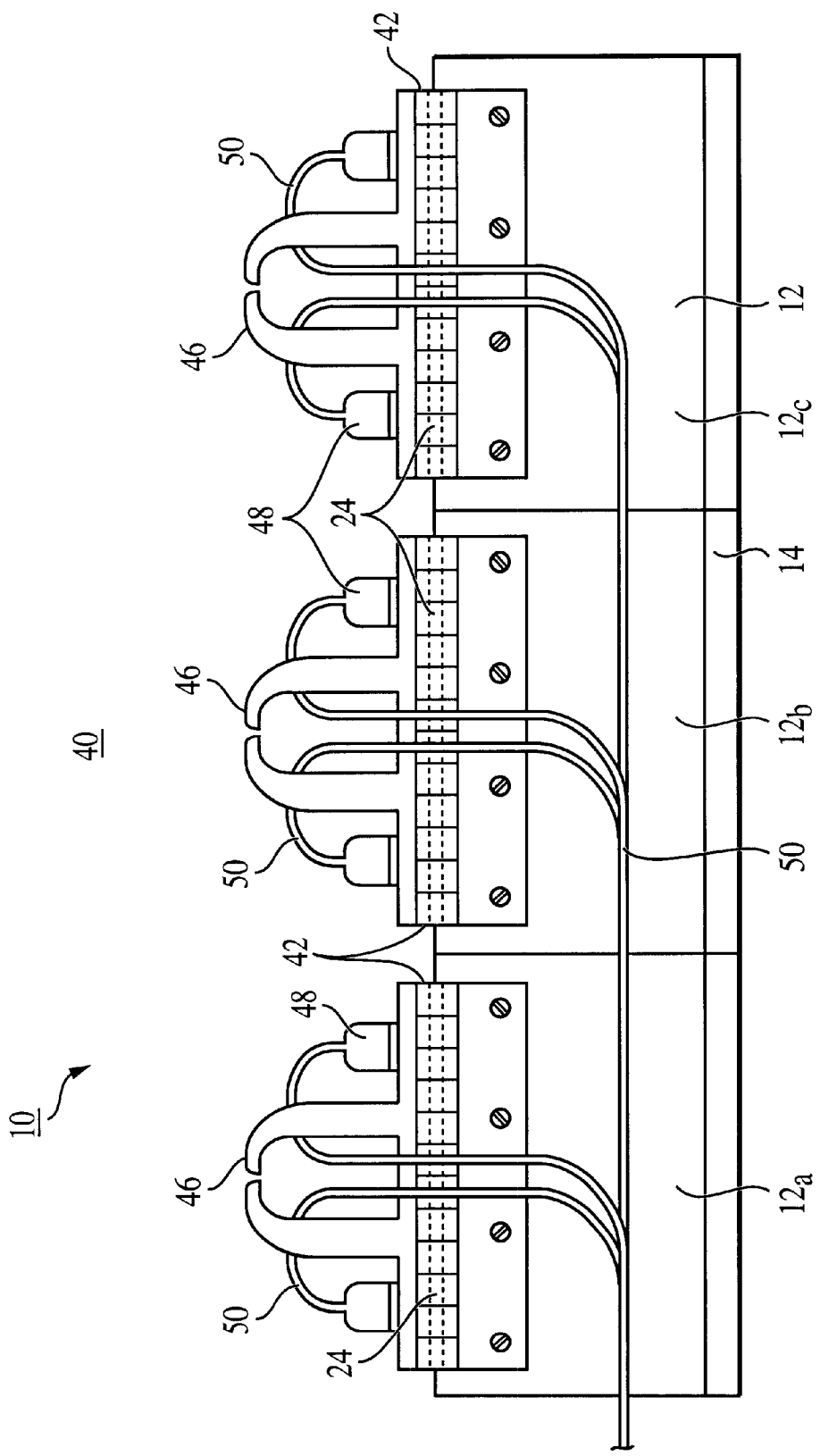
FIG. 3 is another side view of the fiber interconnection box of FIG. 1 showing the pivoting panels in a closed position.

The network side 30 houses one or more spools 32 and one or more fiber troughs 34. As illustrated, a respective spool 32 and fiber trough 34 is included for each corresponding pivoting panel 42. Each of the spools 32 serves as a fiber slack storage unit. Input fibers 38 are introduced into the network side 30 through one or more openings (not shown). The fibers 38 may enter the network side 30 in the form of a cable. The fibers 38 split apart and one or more are coiled about one of the spools 32. Each of the fibers 38 terminates into respective input fiber connector 36. Although two fibers 38 are shown in FIG. 1 to wind through each fiber trough 34, the two are shown for simplicity of illustration. Many more fibers 38 may wind through the fiber troughs 34 as are shown in FIG. 1.

A customer side 40 is provided on the other side of the pivoting panels 42 from the network side 30. Each panel 42 includes a panel handle 44 and a fiber trough 46 on the customer side 40. The fiber troughs 46 are closest to the hinge 24, while the handles 44 are at the distal ends of the panels 42 and are located adjacent the proximity of the side panel flange 18 when the panels 42 pivot to a closed position (FIG. 5). Each hinge 24 is positioned between and connects one of the pivoting panels 42 with one of the panel sections $12_a$, $12_b$, $12_c$.

Output fibers 50 enter the customer side 40, split up, and terminate into respective output fiber connectors 48. Each input fiber connector 36 interconnects with a corresponding output fiber connector 48 through one of the panels 42. Specifically, each of the pivoting panels 42 has a plurality of interconnection sites 70 (FIG. 5) at which the output fiber connectors 48 of the customer side 40 connect with the input fiber connectors 26 of the network side 30. The output fibers 50 leading from the output fiber connectors 48 on each panel 42 travel through a corresponding fiber trough 46. Likewise, on the network side 30, each of the input fiber 38 leading from the input fiber connectors 36 travel through a corresponding fiber trough 34.

The panels 42 are pivoted to the open position (FIGS. 2, 4) when installing, maintaining and/or repairing or replacing components in the network side 30. All other times, the panels 42 are pivoted to the closed position (FIGS. 3, 5) and locked to prevent access.

A plurality of locking mechanisms 22 are included as part of the fiber interconnection box 10. Specifically, a locking mechanism 22 for each of the pivoting panels 42 is included. Only one such locking mechanism 22 is illustrated in FIG. 1 for clarity of illustration. Each locking mechanism 22 includes a hole 28 in the flange 18 and a pin 26 (FIGS. 4–5). The pin 26 includes flared barbs 27 at an end to retain the pin in the flange 18. While a pin and hole arrangement has been illustrated, any other suitable locking mechanism may be used without extending the intended scope of protection.

An optional removable customer cover 60 (FIG. 5) is included and can be positioned so as to segregate the customer side 40 from the outside environment. The cover 60 provides shelter to the customer side 40 from the outside elements, and is received and held, either through friction or any other suitable mechanism, by the handles 44 and the customer side fiber troughs 46.

Figure 6:
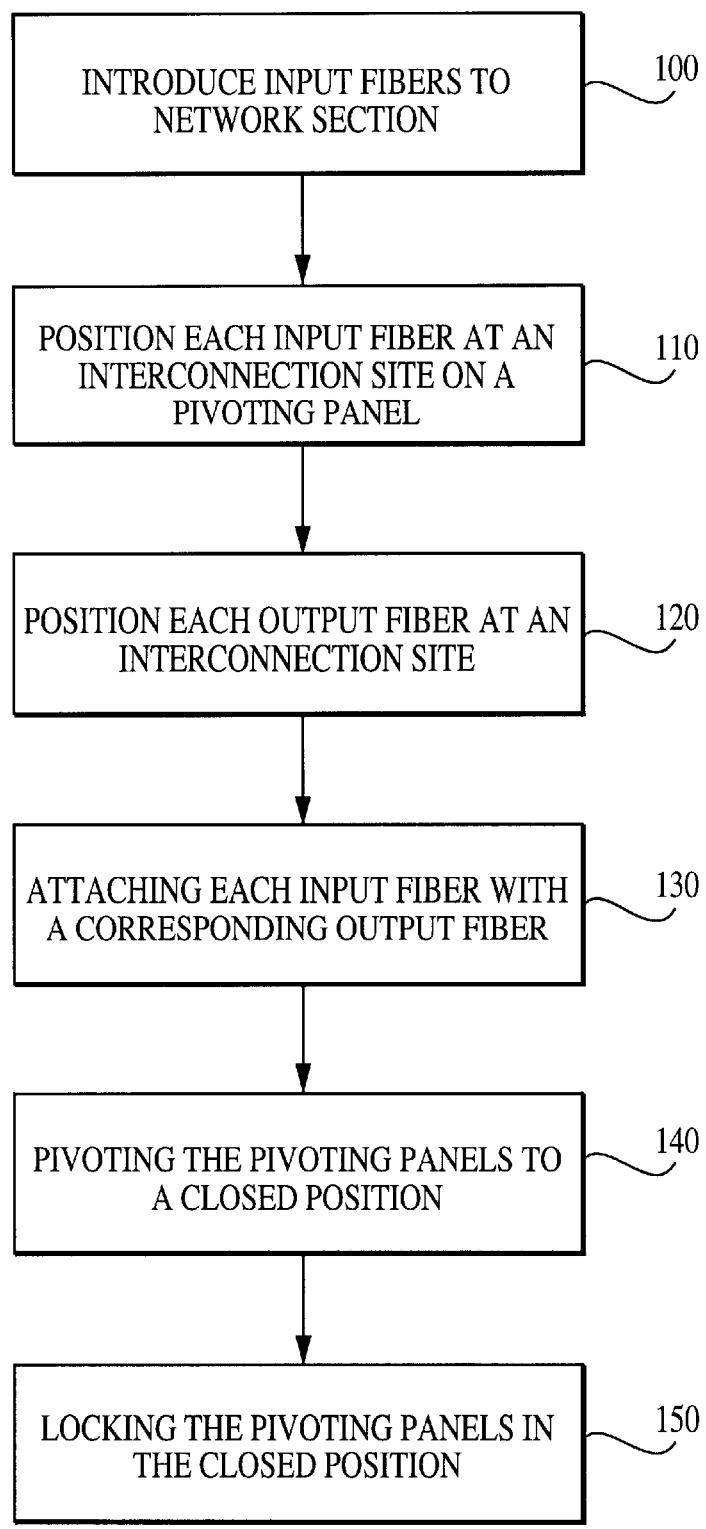
FIG. 6 is a flow diagram of the steps for preventing unauthorized access to the network section of the fiber interconnection box of FIGS. 1–5.

FIG. 6 depicts a method for preventing unauthorized access to a network side of a fiber interconnection box. A plurality of input fibers 38 are introduced to the fiber interconnection box 10 at step 100. Each of the input fibers 38 is positioned at an interconnection site 70 on one of the pivoting panels 42 at step 110. At step 120, a plurality of output fibers 50 are each positioned at an interconnection site 70 on one of the pivoting panels 42, and each input fiber 38 is connected with a corresponding output fiber 50 at step 130. Then, at step 140 the pivoting panels 42 are rotated to a closed position, and each pivoting panel 42 is locked in the closed position at step 150.

While the foregoing has described in detail preferred embodiments known at the time, it should be readily understood that the invention is not limited to the disclosed embodiments. Rather, the invention can be modified to incorporate any number of variations, alterations, substitutions or equivalent arrangements not heretofore described, but which are commensurate with the spirit and scope of the invention. For example, although three pivoting panels 42 are illustrated, obviously one, two, or more than three such panels 42 may be employed without deviating from the scope of the invention.

Accordingly, the invention is not to be seen as limited by the foregoing description, but is only limited by the scope of the appended claims.

What is claimed as new and desired to be protected by Letters Patent of the United States is:

1. A fiber interconnection assembly, comprising:
   a network section, including:
      at least one spool;
      at least one fiber trough; and
      a first side panel having one or more panel sections;
   a customer section, including:
      at least one pivoting panel, said panel hinged to one of said first side panel sections; and
      at least one fiber trough, wherein one each of said network section fiber troughs and said customer section fiber troughs is positioned on a respective pivoting panel.

2. The fiber interconnection assembly of claim 1, comprising a plurality of pivoting panels, each of said pivoting panels having a network section fiber trough and a customer section fiber trough.

3. The fiber interconnection assembly of claim 1, further comprising a back panel and a second side panel, said first and second side panels being connected by said back panel.

4. The fiber interconnection assembly of claim 3, further comprising at least one locking mechanism for locking said pivoting panel to said second side panel.

5. The fiber interconnection assembly of claim 4, wherein said locking mechanism includes a hole extending through said pivoting panel and said second side panel and a pin positioned within said hole which engages and locks said pivoting panel and said second side panel together.

6. The fiber interconnection assembly of claim 5, wherein said second side panel includes a flange, said hole extending through said flange.

7. The fiber interconnection assembly of claim 6, wherein each said pivoting panel includes a handle.

8. The fiber interconnection assembly of claim 7, further comprising a removable cover for covering said customer section.

9. The fiber interconnection assembly of claim 8, wherein said removable cover is received and held by said handles and said customer section fiber troughs.

10. A fiber interconnection system, comprising:
    a network section, including:
       at least one spool;
       at least one fiber trough;
       a first side panel having one or more panel sections; and
       at least one input fiber, wherein each said input fiber is capable of being coiled around a respective one of said spools and being wound through a respective one of said fiber troughs to terminate at an input fiber connector;

a customer section, including:
- at least one pivoting panel, said panel hinged to one of said first side panel sections;
- at least one fiber trough, wherein one each of said network section fiber troughs and said customer section fiber troughs is positioned on each pivoting panel; and
- at least one output fiber, wherein each said output fiber is capable of being routed through a respective one of said customer section fiber troughs to terminate at an output fiber connector and wherein each said output fiber connector is interconnected with a respective input fiber connector through one of said pivoting panels.

11. The fiber interconnection system of claim 10, comprising a plurality of pivoting panels, each of said pivoting panels having a network section fiber trough and a customer section fiber trough.

12. The fiber interconnection system of claim 10, further comprising a back panel and a second side panel, said first and second side panels being connected by said back panel.

13. The fiber interconnection system of claim 12, further comprising at least one locking mechanism for locking said pivoting panel to said second side panel.

14. The fiber interconnection system of claim 13, wherein said locking mechanism includes a hole extending through said pivoting panel and said second side panel and a pin positioned within said hole which engages with and locks said pivoting panel and said second side panel together.

15. The fiber interconnection system of claim 14, wherein said second side panel includes a flange, said hole extending through said flange.

16. The fiber interconnection system of claim 15, wherein each said pivoting panel includes a handle.

17. The fiber interconnection system of claim 16, further comprising a removable cover for covering said customer section.

18. The fiber interconnection system of claim 17, wherein said removable cover is received and held by said handles and said customer section fiber troughs.

19. A method for preventing unauthorized access to a section of a fiber interconnection system including a network section and a customer section, said method comprising the steps of:
- introducing at least one input fiber to the network section;
- positioning each said input fiber at a respective interconnection site, each said interconnection site being located on one of at least one pivoting panel;
- positioning each of at least one output fiber at a respective interconnection site and attaching each said output fiber to a corresponding said input fiber;
- pivoting said at least one pivoting panel to a closed position; and
- locking said at least one pivoting panel in said closed position.

20. The method of claim 19, further comprising winding each said input fiber through a network section fiber trough.

21. The method of claim 19, firther comprising winding each said output fiber through a customer section fiber trough.

22. The method of claim 19, further comprising coiling each said input fiber around at least one spool located in the network section.

23. The method of claim 19, further comprising isolating the customer section from the outside environment.

24. The method of claim 23, wherein said customer section is isolated with a removable cover fitting over said at least one pivoting panel.

25. The method of claim 19, comprising a plurality of pivoting panels.

* * * * *